United States Patent
Kim et al.

(10) Patent No.: US 12,437,555 B2
(45) Date of Patent: Oct. 7, 2025

(54) METHOD FOR TRAJECTORY CORRECTION FOR 3D MAP CREATION, AND COMPUTER PROGRAM RECORDED ON RECORD-MEDIUM FOR EXECUTING METHOD THEREFOR

(71) Applicant: MOBILTECH, Seoul (KR)

(72) Inventors: Jae Seung Kim, Seoul (KR); Jiseong Kim, Seoul (KR)

(73) Assignee: MOBILTECH, Seoul (KR)

( * ) Notice: Subject to any disclaimer, the term of this patent is extended or adjusted under 35 U.S.C. 154(b) by 326 days.

(21) Appl. No.: 18/339,312

(22) Filed: Jun. 22, 2023

(65) Prior Publication Data

US 2024/0212362 A1   Jun. 27, 2024

(30) Foreign Application Priority Data

Dec. 21, 2022   (KR) .................. 10-2022-0181018

(51) Int. Cl.
*G06V 20/58*   (2022.01)

(52) U.S. Cl.
CPC ..................... *G06V 20/58* (2022.01)

(58) Field of Classification Search
CPC ....................................................... G06V 20/58
See application file for complete search history.

(56) References Cited

U.S. PATENT DOCUMENTS

2020/0111358 A1*   4/2020   Parchami ............... G05D 1/028

FOREIGN PATENT DOCUMENTS

| CN | 119783609 A | * | 4/2025 | |
|---|---|---|---|---|
| KR | 10-2013-0123041 A | | 11/2013 | |
| KR | 10-1690882 B1 | | 12/2016 | |
| KR | 10-2017-0056339 A | | 5/2017 | |
| KR | 20170056339 A | * | 5/2017 | ............ B60W 30/10 |
| KR | 10-2019-0064311 A | | 6/2019 | |
| KR | 20190064311 A | * | 6/2019 | ............ G01S 17/89 |

* cited by examiner

*Primary Examiner* — Pinalben Patel
(74) *Attorney, Agent, or Firm* — Bridgeway IP Law Group, PLLC; Jihun Kim

(57) ABSTRACT

A trajectory correction method may include the steps of: correcting, by a map generation device, an error generated due to a change in position targeting 3D point cloud data collected in real time through a LiDAR, of which a position changes in real time; estimating, by the map generation device, an expected trajectory (odometry) related to the change in position on the basis of the corrected 3D point cloud data; applying, by the map generation device, curve fitting to the estimated expected trajectory; and mapping, by the map generation device, the expected trajectory before the curve fitting targeting the expected trajectory to which the curve fitting is applied.

6 Claims, 8 Drawing Sheets

METHOD FOR TRAJECTORY CORRECTION FOR 3D MAP CREATION, AND COMPUTER PROGRAM RECORDED ON RECORD-MEDIUM FOR EXECUTING METHOD THEREFOR

BACKGROUND OF THE INVENTION

Field of the Invention

The present invention relates to a Location Based Service (LBS), more specifically, to a trajectory correction method capable of minimizing errors that may be generated in the process of generating a 3D map based on LiDAR data, and a computer program recorded on a recording medium to execute the same.

Background of the Related Art

Autonomous driving of a vehicle means a system of a vehicle that can operate based on its own decision. The autonomous driving may be classified into progressive levels from non-automation to full-automation according to a degree of involvement of the system in driving and a degree of the driver in controlling the vehicle. Generally, the level of autonomous driving is divided into six levels classified by the Society of Automotive Engineers (SAE) International. According to the six levels classified by the Society of Automotive Engineers (SAE) International, level 0 is non-automation, level 1 is driver assistance, level 2 is partial automation, level 3 is conditional automation, level 4 is high-level automation, and level 5 is full automation.

Autonomous driving of a vehicle is performed through a mechanism of perception, localization, path planning, and control. In addition, various companies are developing to implement the perception and the path planning in the autonomous driving mechanism using artificial intelligence (AI).

For the autonomous driving like this, various information on roads should be preemptively collected. However, it is not easy in reality to collect and analyze a large amount of information in real time using only vehicle sensors. Accordingly, in order to realize autonomous driving, a precise road map that can provide various information actually needed for autonomous driving is essential.

Here, the precise road map refers to a three-dimensional electronic map constructed with information on the roads and surrounding topography at an accuracy of ±25 cm. The precise road map like this is a map including precise information such as road width, road curvature, road slope, lane information (dotted lines, solid lines, stop lines, etc.), surface type information (crosswalks, speed bumps, shoulders, etc.), road surface mark information, road sign information, and facility information (traffic lights, curbs, manholes, etc.), in addition to information on general electronic maps (node information and link information needed for route guidance).

In order to create such a precise road map, various related data such as a Mobile Mapping System (MMS), aerial photographing information, and the like are required.

The MMS is mounted on a vehicle to measure positions of landmarks in the vicinity of a road and acquire visual information while the vehicle is driving. That is, the MMS may be generated based on information collected by Global Positioning System (GPS), Inertial Navigation System (INS), and Inertial Measurement Unit (IMU) for acquiring position and posture information of the vehicle body, and a camera, a Light Detection and Ranging (LiDAR) sensor, and other sensors for collecting shapes and information on landmarks.

Among them, the LiDAR may acquire 3D data expressing the distance and shape of an object by emitting a high-power laser pulse and measuring the time of the laser reflected and returned from a target.

However, since the LiDAR used in the MMS is installed in a vehicle moving on the roads and acquires 3D data in real time, an error may occur as the position of the LiDAR changes during the process of acquiring the 3D data.

In addition, the MMS may have an error due to the installation position and movement of sensors even in the process of comprehensively reflecting the data collected by the LiDAR and data collected by other sensors. In addition, these errors have a problem of lowering accuracy of a generated precise road map.

(Patent Document 0001) Korean Patent Publication No. 10-2013-0123041, 'Indoor map automatic generation method using LiDAR device', (published on Nov. 12, 2013).

SUMMARY OF THE INVENTION

Therefore, the present invention has been made in view of the above problems, and it is an object of the present invention to provide a trajectory correction method capable of minimizing errors that may be generated in the process of generating a 3D map based on LiDAR data.

Another object of the present invention is to provide a computer program recorded on a recording medium to execute a trajectory correction method capable of minimizing errors that may be generated in the process of generating a 3D map based on LiDAR data.

The technical problems of the present invention are not limited to the technical problems mentioned above, and unmentioned other technical problems will be clearly understood by those skilled in the art from the following description.

To accomplish the above objects, the present invention proposes a trajectory correction method. The method may include the steps of: correcting, by a map generation device, an error generated due to a change in position targeting 3D point cloud data collected in real time through a LiDAR, of which a position changes in real time; estimating, by the map generation device, an expected trajectory (odometry) related to the change in position on the basis of the corrected 3D point cloud data; applying, by the map generation device, curve fitting to the estimated expected trajectory; and mapping, by the map generation device, the expected trajectory before the curve fitting targeting the expected trajectory to which the curve fitting is applied.

Specifically, the step of correcting an error may include correcting an error of the 3D point cloud data generated due to a change in the position on the basis of INS and GPS data collected together with the 3D point cloud data at the same time.

The step of correcting an error may include generating fusion data complementing a relative position included in the INS data with an absolute position of the GPS data.

The step of correcting an error may include searching for fusion data closest to a position of the LiDAR, and correcting an error of the 3D point cloud data generated due to a change in the position on the basis of information on a time of collecting the 3D point cloud data and the fusion data.

The step of estimating an expected trajectory may include expressing the 3D point cloud data and the fusion data in a voxel space, and estimating the expected trajectory by approximating a point group included in each voxel using a Gaussian distribution.

The step of estimating an expected trajectory may include transforming coordinates of the estimated expected trajectory into coordinates of the fusion data.

The step of estimating an expected trajectory may include transforming coordinates of the estimated expected trajectory into coordinates of the fusion data through a rotation matrix and a translation matrix for a posture of the LiDAR.

The step of applying curve fitting may include applying curve fitting to the estimated expected trajectory through a Bezier curve fitting algorithm.

The step of applying curve fitting may include performing up-sampling on the expected trajectory to which the curve fitting is applied, and assigning a time stamp to the up-sampled point.

The step of applying curve fitting may include equally assigning time stamps to the up-sampled points at intervals set in advance.

The step of mapping may include correcting location coordinates from a point included in the expected trajectory before curve fitting to a point included in the expected trajectory to which the curve fitting is applied, on the basis of the time stamp.

The step of mapping may include correcting only location coordinates from a point included in the expected trajectory before curve fitting to a point included in the expected trajectory to which the curve fitting is applied, and maintaining posture and speed data.

To accomplish the above objects, the present invention proposes a computer program recorded on a recording medium to execute the trajectory correction method. The computer program may be combined with a computing device including a memory, a transceiver, and a processor for processing instructions loaded on the memory. In addition, the computer program may be a computer program recorded on a recording medium to execute the steps of: correcting, by the processor, an error generated due to a change in position targeting 3D point cloud data collected in real time through a LiDAR, of which an installation position changes in real time; estimating, by the processor, an expected trajectory (odometry) related to the change in position on the basis of the corrected 3D point cloud data; applying, by the processor, curve fitting to the estimated expected trajectory; and mapping, by the processor, the expected trajectory before the curve fitting targeting the expected trajectory to which the curve fitting is applied.

Details of embodiments are included in the detailed description and drawings.

According to the embodiments of the present invention, errors that may be generated in the process of generating a 3D map can be minimized by correcting errors in 3D point cloud data collected through a LiDAR, and generating a 3D map through a trajectory mapped by applying curve fitting to an expected trajectory estimated through error-corrected 3D point cloud data.

The effects of the present invention are not limited to the effects mentioned above, and unmentioned other effects will be clearly understood by those skilled in the art from the following description.

DETAILED DESCRIPTION OF THE PREFERRED EMBODIMENT

Figure 1:
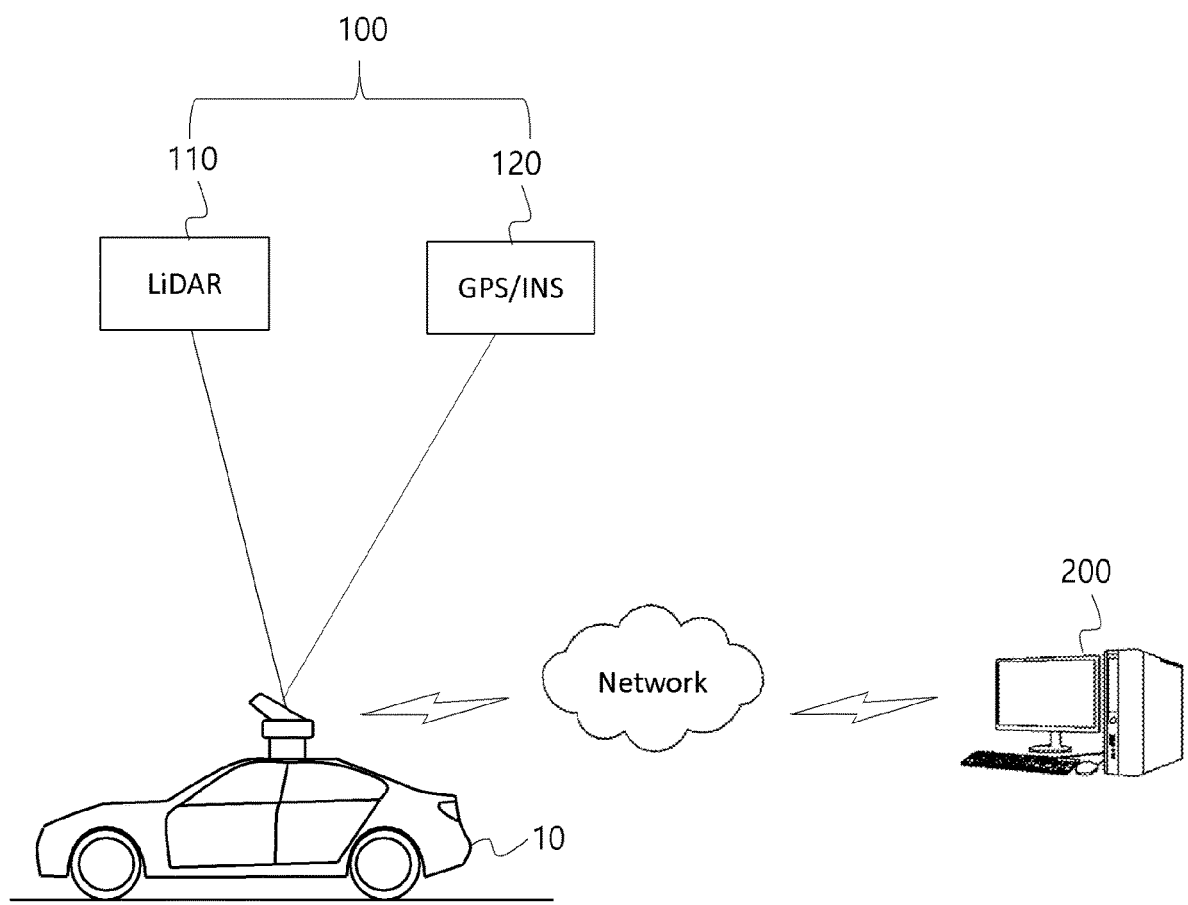
FIG. 1 is a view showing the configuration of a map generation system according to an embodiment of the present invention.

It should be noted that the technical terms used in this specification are only used to describe specific embodiments and are not intended to limit the present invention. In addition, the technical terms used in this specification should be interpreted as a meaning commonly understood by those of skilled in the art, unless specifically defined otherwise in this specification, and should not be interpreted in an excessively inclusive or reduced meaning. In addition, when the technical terms used in this specification are incorrect technical terms that do not accurately express the spirit of the present invention, they should be replaced with technical terms that those skilled in the art can correctly understand. In addition, general terms used in the present invention should be interpreted as defined in a dictionary or according to the context, and should not be interpreted in an excessively reduced meaning.

In addition, singular expressions used in this specification include plural expressions unless the context clearly indicates otherwise. In this application, terms such as 'configured of' or 'having' should not be interpreted as necessarily including all of the various components or steps described in the specification, and should be interpreted as including some of the components or steps among them, or further including additional components or steps.

In addition, although the terms including ordinal numbers such as first, second, and the like used in this specification may be used to describe various components, the components should not be limited by the terms. The terms are used only for the purpose of distinguishing one component from another. For example, a first component may be named as a second component without departing from the scope of the present invention, and similarly, a second component may also be named as a first component.

When a component is referred to as being 'connected' or 'coupled' to another component, although it may be directly connected or coupled to another component, other components may exist between the components. On the contrary, when a component is referred to as being 'directly connected' or 'directly coupled' to another component, it should be understood that no other component exists therebetween.

Hereinafter, preferred embodiments according to the present invention will be described in detail with reference to the accompanying drawings, and the same or similar components are given the same reference numerals regardless of drawing symbols, and redundant description thereof will be omitted. In addition, when it is determined in describing the present invention that a detailed description of a related known technology may obscure the gist of the present invention, the detailed description will be omitted. In addition, it should be noted that the accompanying drawings are only for easy understanding of the spirit of the present invention, and it should not be construed as limiting the spirit of the present invention by the accompanying drawings. The spirit of the present invention should be interpreted as extending to all changes, equivalents, and substitutes, in addition to the accompanying drawings.

Meanwhile, the MMS is mounted on a vehicle to measure positions of landmarks in the vicinity of a road and acquire visual information while the vehicle is driving. That is, the MMS may be generated based on information collected by Global Positioning System (GPS), Inertial Navigation System (INS), and Inertial Measurement Unit (IMU) for acquiring position and posture information of the vehicle body, and a camera, a Light Detection and Ranging (LiDAR) sensor, and other sensors for collecting shapes and information on landmarks.

Among them, the LiDAR may acquire 3D data expressing the distance and shape of an object by emitting a high-power laser pulse and measuring the time of the laser reflected and returned from a target.

However, since the LiDAR used in the MMS is installed in a vehicle moving on the roads and acquires 3D data in real time, an error may occur as the position of the LiDAR changes during the process of acquiring the 3D data.

In addition, the MMS may have an error due to the installation position and a degree of movement of sensors even in the process of comprehensively reflecting the data collected by the LiDAR and data collected by other sensors. In addition, these errors have a problem of lowering accuracy of a generated precise road map.

To overcome these limitations, the present invention proposes various means capable of minimizing errors that may be generated in the process of generating a 3D map using 3D point cloud data collected through a LiDAR.

Hereinafter, various embodiments of the present invention having the characteristics as described above will be described in more detail.

FIG. 1 is a view showing the configuration of a map generation system according to an embodiment of the present invention.

As shown in FIG. 1, a map generation system according to an embodiment of the present invention may be configured to include a data collection device 100 and a map generation device 200.

Since the components of the map generation system according to an embodiment are only functionally distinguished components, two or more components may be implemented to be integrated in an actual physical environment, or one component may be implemented to be separated in an actual physical environment.

Describing each component, the data collection device 100 may be fixedly installed in a vehicle 10 and include a LiDAR 110, an Inertial Navigation System (INS) 120, and a Global Positioning System (GPS) 130 to collect data that can be used for generation of a 3D map.

Here, the LiDAR 110 included in the data collection device 100 may be fixedly installed in the vehicle 10 to emit laser pulses around the vehicle 10, detect light reflected and returned from objects located around the vehicle 10, and generate 3D point cloud data corresponding to three-dimensional images of around the vehicle 10. Accordingly, the 3D point cloud data acquired by the LiDAR 110 may include a set of points reflecting the laser pulses emitted into a three-dimensional space by the LiDAR 110.

Meanwhile, the INS 120 is a system that calculates information about a relative position, a real-time speed, and a posture using acceleration and angular velocity measured by a gyro sensor and an acceleration sensor, which are inertial sensors (IMUs). Since the INS 120 calculates the posture and speed by integrating input values of the acceleration sensor and the gyro sensor, there is a disadvantage of accumulating errors over time.

On the other hand, the GPS 130 is a radio wave navigation system that calculates an absolute position on the earth using satellites, and has an advantage of not accumulating errors over time unlike the INS 120 although a short-term navigation error is large.

Accordingly, the data collection device 100 may collect a relative position, posture, and speed from the INS 120, collect an absolute position from the GPS 130, and transmit the data to the map generation unit 200. Accordingly, the data collection device 100 may generate fusion data complementing the relative position that the map generation device 200 has collected from the INS 120 with the absolute position of the GPS 130.

As a next configuration, the map generation device 200 is a device that can be used to receive data collected by the LiDAR 110, the INS 120, and the GPS 130 from the data collection device 100, and generate a 3D map using the received data.

The map generation device 200 as described above is basically a device that is distinguished from the data collection device 100, but may be implemented to be integrated with the data collection device 100 as one device in an actual physical environment. That is, the map generation device 200 may be integrated with the data collection device 100 to collect data for generating a 3D map and generate a 3D map using the data collected by itself.

Characteristically, the map generation device 200 according to an embodiment of the present invention may correct an error generated due to a change in position targeting the 3D point cloud data collected in real time through a LiDAR, of which the position changes in real time, estimate an expected trajectory (odometry) related to the change in position on the basis of the corrected 3D point cloud data, apply curve fitting to the estimated expected trajectory, and map the expected trajectory before the curve fitting targeting the expected trajectory to which the curve fitting is applied.

Here, the curve fitting is an algorithm for generating an estimated expected trajectory as the most ideal straight line or curved line that can be expressed. That is, the map generation device 200 according to an embodiment of the present invention may obtain interpolation and smoothing effects for the 3D point cloud data by applying curve fitting to the collected 3D point cloud data.

Any device capable of transmitting and receiving data to and from the data collection device 100 and performing operation based on the transmitted and received data may be accepted as the map generation device 200 as described above. For example, the map generation device 200 may be any one of fixed-type computing devices such as a desktop, a workstation, and a server, but it is not limited thereto.

The data collection device 100 and the map generation device 200 described above may transmit and receive data using a network combining one or more among a security circuit, a public wired communication network, and a mobile communication network directly connecting the devices.

For example, the public wired communication network may include Ethernet, x Digital Subscriber Line (xDSL), Hybrid Fiber Coax (HFC), and Fiber-To-The-Home (FTTH), but it is not limited thereto. In addition, the mobile communication network may include Code Division Multiple Access (CDMA), Wideband CDMA (WCDMA), High Speed Packet Access (HSPA), Long Term Evolution (LTE), and 5th generation mobile telecommunication, but it is not limited thereto.

Hereinafter, the logical configuration of the map generation device 200 according to an embodiment of the present invention will be described in detail.

Figure 2:
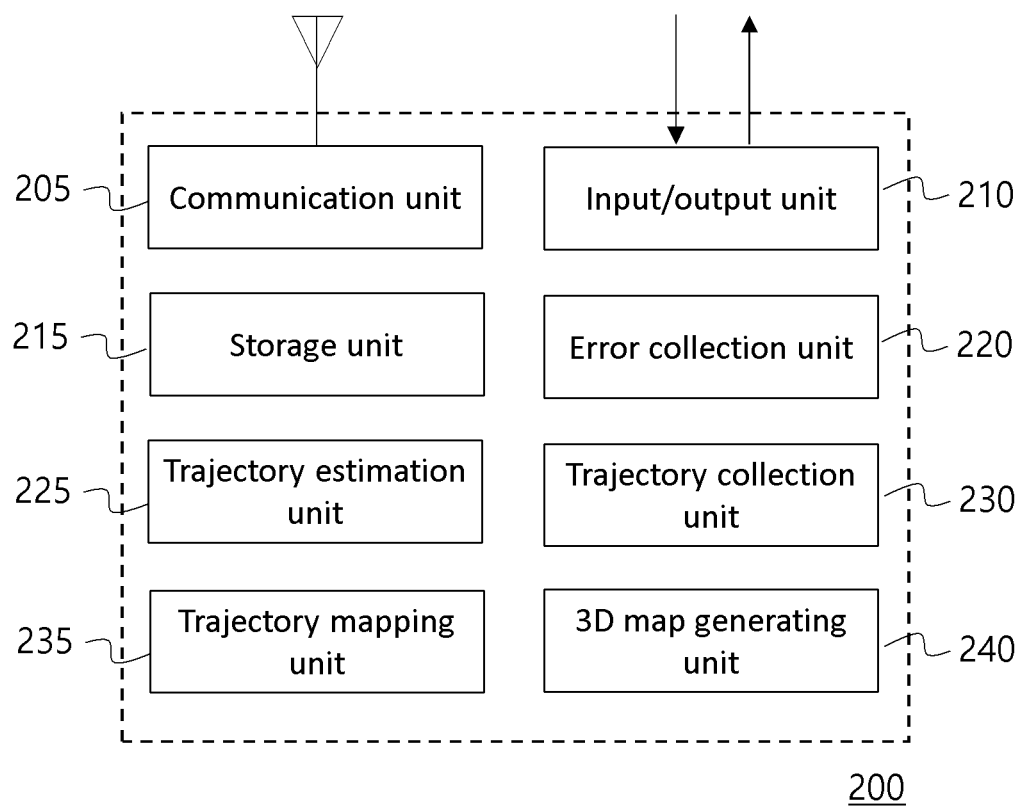
FIG. 2 is a block diagram showing the logical configuration of a map generation device according to an embodiment of the present invention.

FIG. 2 is a block diagram showing the logical configuration of a map generation device according to an embodiment of the present invention.

As shown in FIG. 2, the map generation device 200 according to an embodiment of the present invention may be configured to include a communication unit 205, an input/output unit 210, a storage unit 215, an error correction unit 220, a trajectory estimation unit 225, a trajectory correction unit 230, a trajectory mapping unit 235, and a 3D map generating unit 240.

Since the components of the map generation device 200 are only functionally distinguished components, two or more components may be implemented to be integrated in an actual physical environment, or one component may be implemented to be separated in an actual physical environment.

Describing each component, the communication unit 205 may receive 3D point cloud data generated using the LiDAR 110, relative position, posture and speed values generated by the INS 120, and an absolute position value generated by the GPS 130 from the data collection device 100.

In addition, the communication unit 205 may transmit all or part of the generated 3D map to a plurality of vehicles for autonomous driving.

As a next configuration, the input/output unit 210 may receive a signal from a user through a user interface (UI) or output an operation result to the outside.

Specifically, the input/output unit 210 may receive control signals for error correction, trajectory estimation, trajectory correction, trajectory mapping, and 3D map generation from the user. That is, the input/output unit 210 may receive a control signal for correcting an error of 3D point cloud data, a control signal for estimating an expected trajectory, a control signal for applying curve fitting to the estimated expected trajectory, a control signal for mapping the expected trajectory applied with curve fitting, and the like.

As a next configuration, the storage unit 215 may store the 3D point cloud data received through the communication unit 205 and the position, posture, and speed values of the INS 120 and the GPS 130. In addition, the storage unit 215 may receive a program for correcting an error of 3D point cloud data, a program for estimating an expected trajectory, a program for applying curve fitting to the estimated expected trajectory, a program for mapping the expected trajectory applied with curve fitting, and the like.

Meanwhile, the data collection device 100 collects 3D point cloud data from the LiDAR 110 through the vehicle 10 while moving. At this point, the collected 3D point cloud data is generated based on the relative coordinates at each point. Therefore, in order to transform a plurality of 3D point cloud data into the same coordinate system, it is necessary to accurately know the trajectory (odometry) of the LiDAR 110. Here, in order to know the trajectory of the LiDAR 110, position information of the LiDAR 110 is required.

The error correction unit 220 may correct an error generated due to a change in position targeting the 3D point cloud data collected in real time through the LiDAR, of which the position changes in real time. That is, the error correction unit 220 may correct an error of the 3D point cloud data generated due to a change in the position on the basis of data of the INS 120 and the GPS 130 collected together with the 3D point cloud data at the same time.

Specifically, the error correction unit 220 may generate fusion data complementing the relative position included in the INS 120 data with the absolute position of the GPS 130 data. In addition, the error correction unit 220 may search for fusion data closest to the position of the LiDAR 110, and correct an error of the 3D point cloud data generated due to a change in the position of the LiDAR 110 on the basis of information on the time of collecting the 3D point cloud data and the fusion data.

For example, the error correction unit 220 may correct errors of 3D point cloud data using the pseudo code shown below.

```
Iteration statement (repeat for points corresponding to one frame of
LiDAR)
Search for route data (INS/GPS) closest to the current LiDAR point
timeDiff = (Current LiDAR point data time) − (Current INS/GPS data
time)
pt_easting = INS_easting + INS__eastingVelocity * timeDiff
pt_northing = INS_northing + INS_northingVelocity * timeDiff
pt_up = INS_up + INS_upVelocity * timeDiff
```

Here, INS/GPS means fusion data, and variables prefixed with INS_ may be location and speed data of the fusion data.

As a next configuration, the trajectory estimation unit 225 may estimate an expected trajectory (odometry) of the 3D point cloud data corrected by the error correction unit 220. Here, the expected trajectory may be a point indicating the position of each frame.

Specifically, the trajectory estimation unit 225 may express the 3D point cloud data and the fusion data in a voxel space, and estimate an expected trajectory by approximating a point group included in each voxel using a Gaussian distribution. That is, the trajectory estimation unit 225 estimates an expected trajectory using a Normal Distribution Transform (NDT) matching algorithm.

Here, the NDT algorithm may process voxel space indexing in a 3D space, and obtain a relatively fast calculation speed compared with the iterative closest points (ICP) algorithm by approximating the point group of each voxel using a 3D Gaussian distribution.

Thereafter, the trajectory estimation unit 225 may transform coordinates of the estimated expected trajectory into coordinates of the fusion data. That is, the estimated expected trajectory indicates the position of the LiDAR 110 on the world coordinate system. Accordingly, the trajectory estimation unit 225 may transform the position of the LiDAR 110 on the world coordinate system into the position of the fusion data.

At this point, the trajectory estimation unit 225 may transform coordinates of the estimated expected trajectory into coordinates of the fusion data through a rotation matrix and a translation matrix for the posture of the LiDAR 110.

For example, the trajectory estimation unit 225 may transform the position of the LiDAR 110 into the position of the fusion data (INS/GPS) through Equation 1 shown below.

First, CurLiDARPose may be expressed as a 3×1 Matrix (roll, pitch, yaw), CurLiDARPose may be expressed as a 3×1 Matrix (easting, northing, up), and INS/GPS_Position may be expressed as a 3×1 Matrix (easting, northing, up).

$$INS/GPS_{Position} = RotationMatrix(CurLiDARPose_{roll},$$
$$CurLiDARPose_{pitch}, CuLiDARPose_{yaw}) * T_{L21} +$$
$$CurLiDAR_{Position}$$
[Equation 1]

Here, $T_{L21}$ may be a 3×1 matrix (LiDAR to IMU translation).

At this point, CurLiDARPose may be expressed as a Rotation Matrix using Euler angles as shown in Equation 2 below.

When Z-axis rotation is set to α, y-axis rotation to β, and z-axis rotation to γ (α, β, γ: Radian), $$RotationMatric(\alpha, \beta, \gamma) = \begin{bmatrix} \cos\alpha\cos\beta & \cos\alpha\sin\beta\sin\gamma - \sin\alpha\cos\gamma & \cos\alpha\sin\beta\sin\gamma + \sin\alpha\cos\gamma \\ \sin\alpha\cos\beta & \sin\alpha\sin\beta\sin\gamma + \cos\alpha\cos\gamma & \sin\alpha\sin\beta\sin\gamma - \cos\alpha\cos\gamma \\ -\sin\beta & \cos\beta\sin\gamma & \cos\beta\cos\gamma \end{bmatrix}$$
[Equation 2]

As a next configuration, the trajectory correction unit 230 may apply curve fitting to the expected trajectory estimated by the trajectory estimation unit 225.

That is, the map generation device 200 according to an embodiment of the present invention may obtain interpolation and smoothing effects for the 3D point cloud data by applying curve fitting to the collected 3D point cloud data.

At this point, the trajectory correction unit 230 may apply curve fitting to the estimated expected trajectory through a Bezier curve fitting algorithm. That is, the trajectory correction unit 230 may form a curved line from an expected trajectory including a plurality of points. The trajectory correction unit 230 may form a curved line using Equation 3 shown below.

$$B(u) = \sum_{k=0}^{N} P_k \frac{N!}{k!(N-k)!} * u^k * (1-u)^{N-k}$$
[Equation 3]

Here, B(u) denotes a Bezier curve function, Pk denotes coordinates at each point of an expected trajectory, N denotes the number of points, and u denotes a constant ratio between points.

In addition, the trajectory correction unit 230 may perform up-sampling on the expected trajectory to which the curve fitting is applied, and assign a time stamp to the up-sampled point. Here, the trajectory correction unit 230 may equally assign time stamps to the up-sampled points at intervals set in advance. That is, the trajectory correction unit 230 may generate points at regular intervals on the basis of time on the predicted trajectory to which the curve fitting is applied, and may input time-related information into the generated points.

As a next configuration, the trajectory mapping unit 235 may correct location coordinates from a point included in the expected trajectory before curve fitting to a point included in the expected trajectory to which the curve fitting is applied, on the basis of the time stamp generated by the trajectory correction unit 230. At this point, the trajectory mapping unit 235 may correct location coordinates from a point included in the expected trajectory before curve fitting to a point included in the expected trajectory to which the curve fitting is applied. That is, the trajectory mapping unit 235 may traverse each point of the trajectory before correction, read easting, northing, and up values at the position of a point having the closest time stamp, correct the location coordinates of the trajectory.

As a next configuration, the 3D map generation unit 240 may generate a 3D map by unifying and overlapping 3D point cloud data at each point in a standard coordinate system with reference to a trajectory finally generated by the trajectory mapping unit 235.

Hereinafter, hardware for implementing the logical components of the map generation device 200 according to an embodiment of the present invention as described above will be described in more detail.

Figure 3:
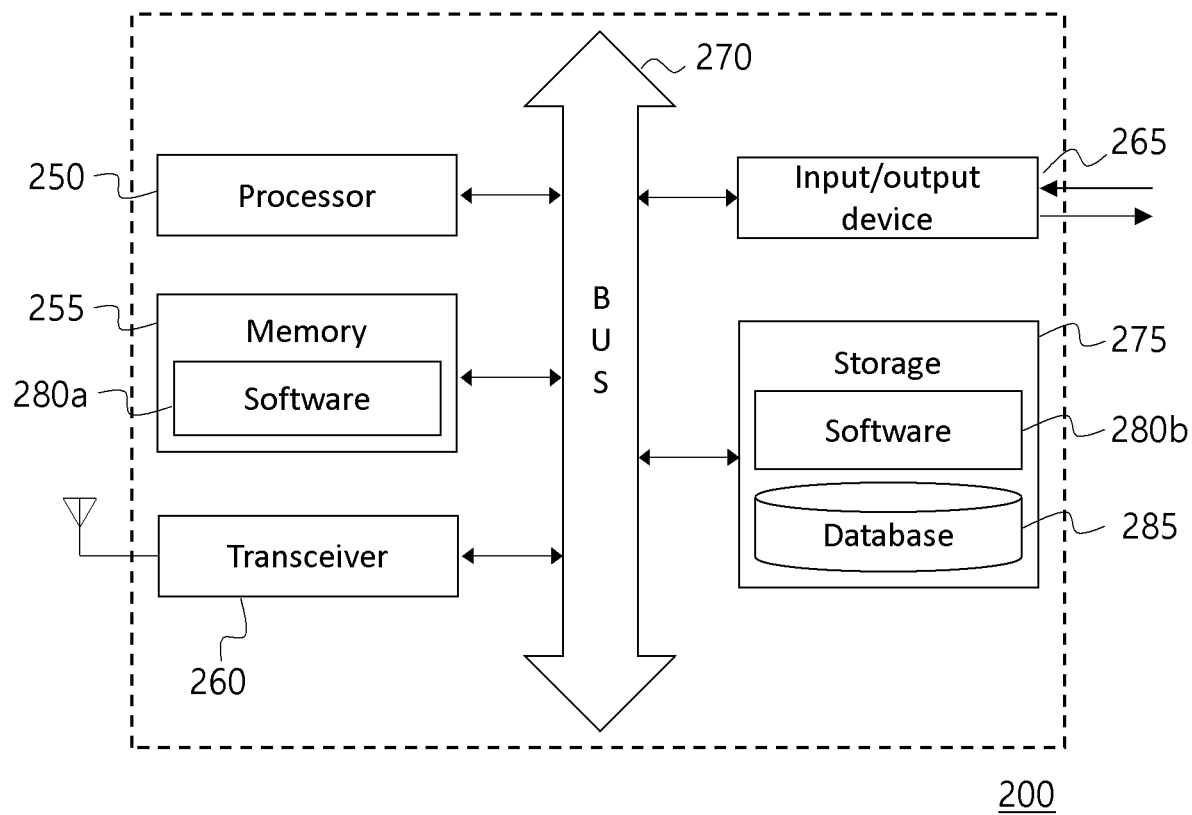
FIG. 3 is a block diagram showing the hardware configuration of a map generation device according to an embodiment of the present invention.

FIG. 3 is a block diagram showing the hardware configuration of a map generation device according to an embodiment of the present invention.

As shown in FIG. 3, the map generation device 300 may be configured to include a processor 250, a memory 255, a transceiver 260, an input/output device 265, a data bus 270, and storage 275.

The processor 250 may implement operations and functions of the map generation device 200 on the basis of instructions according to the software 280a that implements the method according to the embodiments of the present invention loaded on the memory 255. The software 280a implementing the method according to the embodiments of the present invention may be loaded on the memory 255. The transceiver 260 may transmit and receive data to and from the data collection device 100. The input/output device 265 may receive data needed for the operation of the map generation device 200 and output the collected point cloud data, generated 3D map, and the like. The data bus 270 is connected to the processor 250, the memory 255, the transceiver 260, the input/output device 265, and the storage 275 to perform a function of a movement path for transferring data between the components.

The storage 275 may store application programming interfaces (API), library files, resource files, and the like needed for execution of the software 280a in which the method according to the embodiments of the present invention is implemented. The storage 275 may store software 280b in which the method according to the embodiments of the present invention is implemented. In addition, the storage 275 may store information needed for performing the method according to the embodiments of the present invention.

According to an embodiment of the present invention, the software 280a and 280b for implementing a guide providing method, which is loaded on the memory 255 or stored in the storage 275, may be a computer program recorded on a recording medium to execute, by the processor 250, the steps of: correcting an error generated due to a change in position targeting the 3D point cloud data collected in real time through a LiDAR, of which the position changes in real time; estimating an expected trajectory related to the change in position on the basis of the corrected 3D point cloud data; applying curve fitting to the estimated expected trajectory; and mapping the expected trajectory before the curve fitting targeting the expected trajectory to which the curve fitting is applied.

More specifically, the processor 250 may include an Application-Specific Integrated Circuit (ASIC), another chipset, a logic circuit, and/or a data processing device. The memory 255 may include read-only memory (ROM), random access memory (RAM), flash memory, a memory card, a storage medium, and/or other storage devices. The transceiver 260 may include a baseband circuit for processing wired/wireless signals. The input/output device 265 may include an input device such as a keyboard, a mouse, and/or a joystick, an image output device such as a Liquid Crystal Display (LCD), an Organic LED (OLED), and/or an active matrix OLED (AMOLED), and a printing device such as a printer, a plotter, or the like.

When the embodiments included in this specification are implemented as software, the method described above may be implemented as a module (process, function, or the like) that performs the functions described above. The module may be loaded on the memory 255 and executed by the processor 250. The memory 255 may be inside or outside the processor 250 and connected to the processor 250 by various well-known means.

Each component shown in FIG. 3 may be implemented by various means, for example, hardware, firmware, software, or a combination thereof. When a component is implemented as hardware, an embodiment of the present invention may be implemented as one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In addition, when the component is implemented as firmware or software, an embodiment of the present invention may be implemented in the form of a module, procedure, function, or the like that performs the functions or operations described above, and recorded on a recording medium that can be read through various computer means. Here, the recording medium may include program commands, data files, data structures, and the like individually or in combination. Program instructions recorded on a recording medium may be instructions specially designed and configured for the present invention or those known to and used by those skilled in computer software. For example, the recording medium includes magnetic media such as hard disks, floppy disks, and magnetic tapes, optical media such as Compact Disk Read Only Memory (CD-ROMs) and Digital Video Disks (DVDs), magneto-optical media such as floptical disks, and hardware devices specially configured to store and execute program instructions, such as ROM, RAM, flash memory, and the like. Examples of the program instructions may include high-level language codes that can be executed by a computer using an interpreter or the like, as well as machine language codes generated by a compiler. These hardware devices may be configured to operate as one or more pieces of software to perform the operations of the present invention, and vice versa.

Hereinafter, a map generation method according to an embodiment of the present invention will be described in detail.

Figure 4:
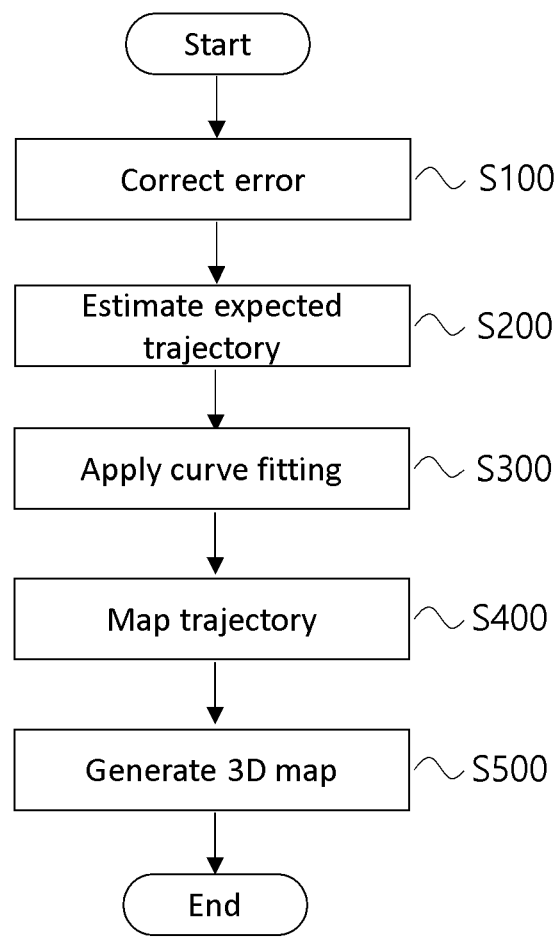
FIG. 4 is a flowchart illustrating a map generation method according to an embodiment of the present invention.

FIG. 4 is a flowchart illustrating a map generation method according to an embodiment of the present invention.

Referring to FIG. 4, the map generation device 200 according to an embodiment of the present invention may correct an error generated due to a change in position targeting the 3D point cloud data collected in real time through the LiDAR, of which the position changes in real time (S100). That is, the map generation device 200 may correct an error of the 3D point cloud data generated due to a change in the position on the basis of data of the INS 120 and the GPS 130 collected together with the 3D point cloud data.

Specifically, the map generation device 200 may generate fusion data complementing the relative position included in the INS data with the absolute position of the GPS data. In addition, the map generation device 200 may search for fusion data closest to the position of the LiDAR 110, and correct an error of the 3D point cloud data generated due to a change in the position on the basis of information on the time of collecting the 3D point cloud data and the fusion data.

Next, the map generation device 200 may estimate an expected trajectory (odometry) of the 3D point cloud data corrected at step S100 (S200).

Specifically, the map generation device 200 may express the 3D point cloud data and the fusion data in a voxel space, and estimate an expected trajectory by approximating a point group included in each voxel using a Gaussian distribution. That is, the map generation device 200 estimates an expected trajectory using a Normal Distribution Transform (NDT) matching algorithm.

Thereafter, the map generation device 200 may transform coordinates of the estimated expected trajectory into coordinates of the fusion data. That is, the estimated expected trajectory indicates the position of the LiDAR 110 on the world coordinate system. Accordingly, the map generation device 200 may transform the position of the LiDAR 110 on the world coordinate system into the position of the fusion data using the position relation with the fusion data.

At this point, the map generation device 200 may transform coordinates of the estimated expected trajectory into coordinates of the fusion data through a rotation matrix and a translation matrix for the posture of the LiDAR 110.

Next, the map generation device 200 may apply curve fitting to the expected trajectory estimated at step S200 (S300). That is, the map generation device 200 may obtain interpolation and smoothing effects for the 3D point cloud data by applying curve fitting to the collected 3D point cloud data. At this point, the map generation device 200 may apply curve fitting to the estimated expected trajectory through a Bezier curve fitting algorithm.

In addition, the map generation device 200 may perform up-sampling on the expected trajectory to which the curve fitting is applied, and assign a time stamp to the up-sampled point. Here, the map generation device 200 may equally assign time stamps to the up-sampled points at intervals set in advance. That is, the map generation device 200 may generate points at regular intervals on the basis of time on the predicted trajectory to which the curve fitting is applied, and may input time-related information into the generated points.

Next, the map generation device 200 may correct location coordinates from a point included in the expected trajectory before curve fitting to a point included in the expected trajectory to which the curve fitting is applied, on the basis of the time stamp generated at step S300. At this point, the map generation device 200 may correct only the location coordinates from a point included in the expected trajectory before curve fitting to a point included in the expected trajectory to which the curve fitting is applied, and maintain posture and speed data.

Then, the map generation device 200 may generate a 3D map by unifying and overlapping 3D point cloud data at each point in a standard coordinate system with reference to a trajectory finally generated at step S400.

Figure 5:
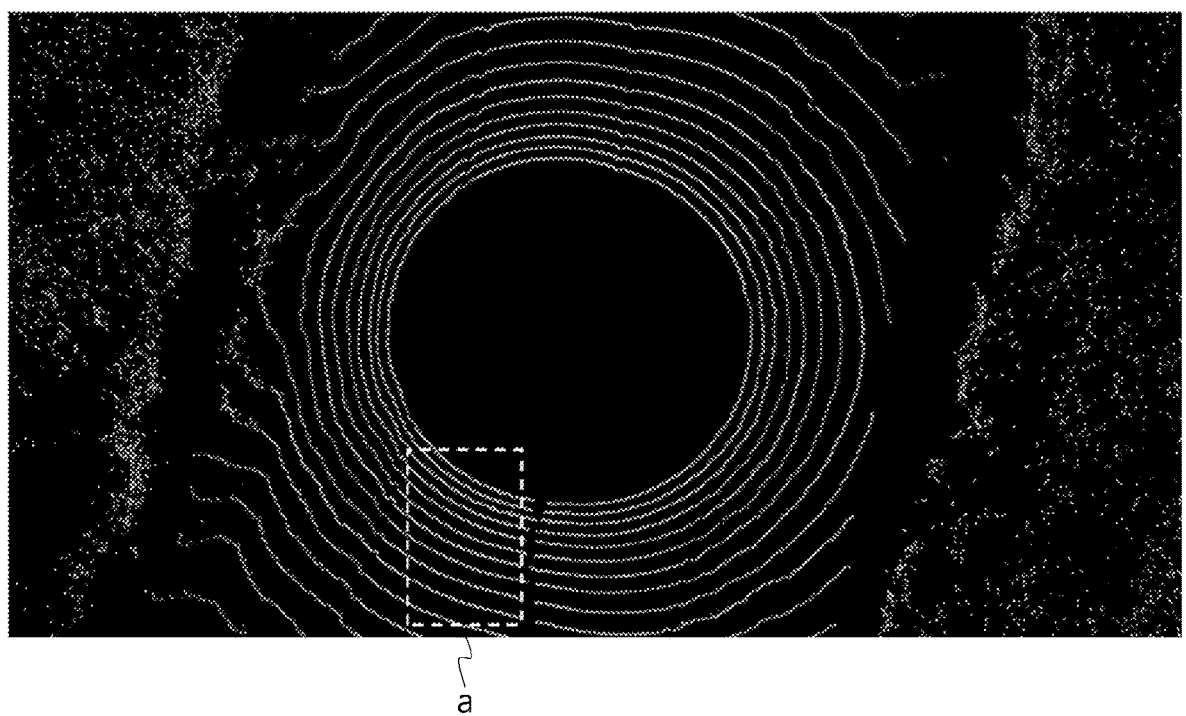
FIG. 5 is a view visualizing 3D point cloud data as a bird's eye view before performing correction of an error generated due to change in the position of a LiDAR according to an embodiment of the present invention.
Figure 6:
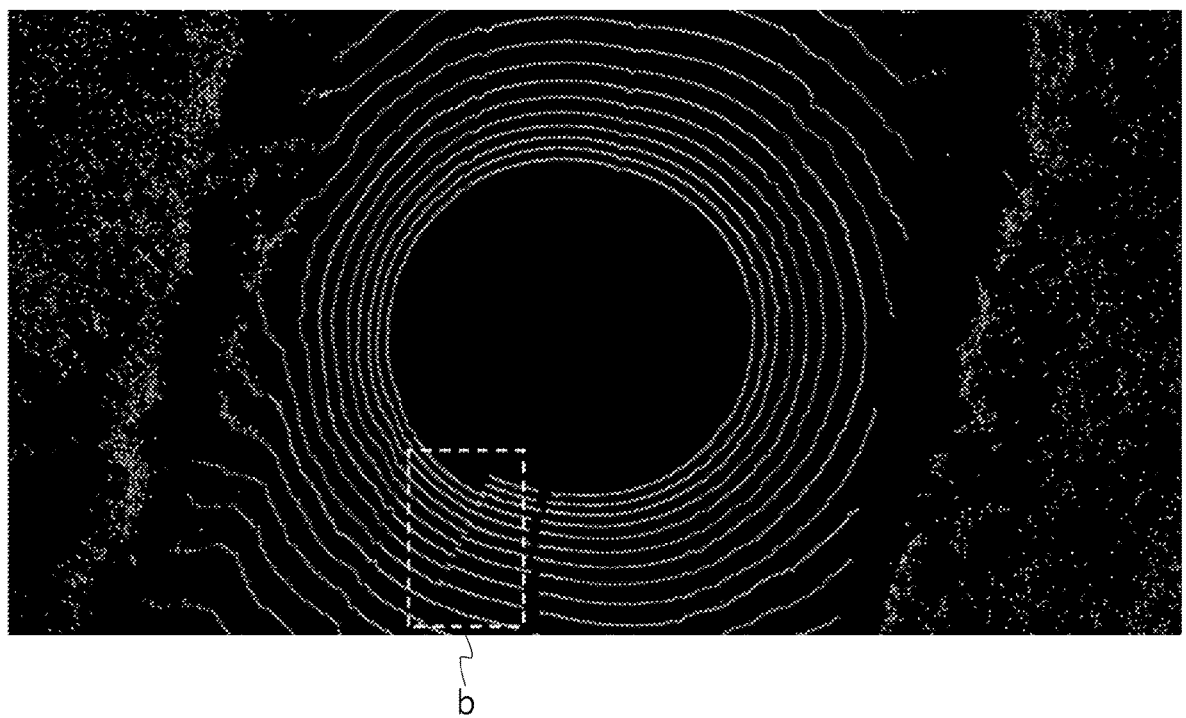
FIG. 6 is a view visualizing 3D point cloud data as a bird's eye view after performing correction of an error generated due to change in the position of a LiDAR according to an embodiment of the present invention.

FIGS. 5 and 6 are views visualizing 3D point cloud data as a bird's eye view before and after performing correction of an error generated due to change in the position of a LiDAR according to an embodiment of the present invention.

Meanwhile, the LiDAR 110 of the data collection device 100 according to an embodiment of the present invention is mounted on the vehicle 10 and collects 3D point cloud data while moving.

However, in the process of data processing, the processing is performed under the assumption that one frame is located at the same position. That is, within one frame, points are arranged without considering change in the position of the LiDAR 110.

Accordingly, as shown in 'a' of FIG. 5, the starting point and the ending point of the 3D point cloud data appear to be overlapped within one frame. However, in practice, the starting point does not overlap with the ending point in the 3D point cloud data according to change in the position.

Accordingly, the map generation device 200 according to an embodiment of the present invention may correct an error of the 3D point cloud data generated due to a change in the position of the LiDAR 110 on the basis of data of the INS 120 and the GPS 130 collected together with the 3D point cloud data.

Specifically, the map generation device 200 may generate fusion data complementing the relative position included in the INS 120 data with the absolute position of the GPS 130 data. In addition, the map generation device 200 may search for fusion data closest to the position of the LiDAR 110, and correct an error of the 3D point cloud data generated due to a change in the position on the basis of information on the time of collecting the 3D point cloud data and the fusion data.

That is, as shown in 'b' of FIG. 6, the map generation device 200 may obtain 3D point cloud data considering change in the position of the LiDAR 110 through error correction.

Figure 7:
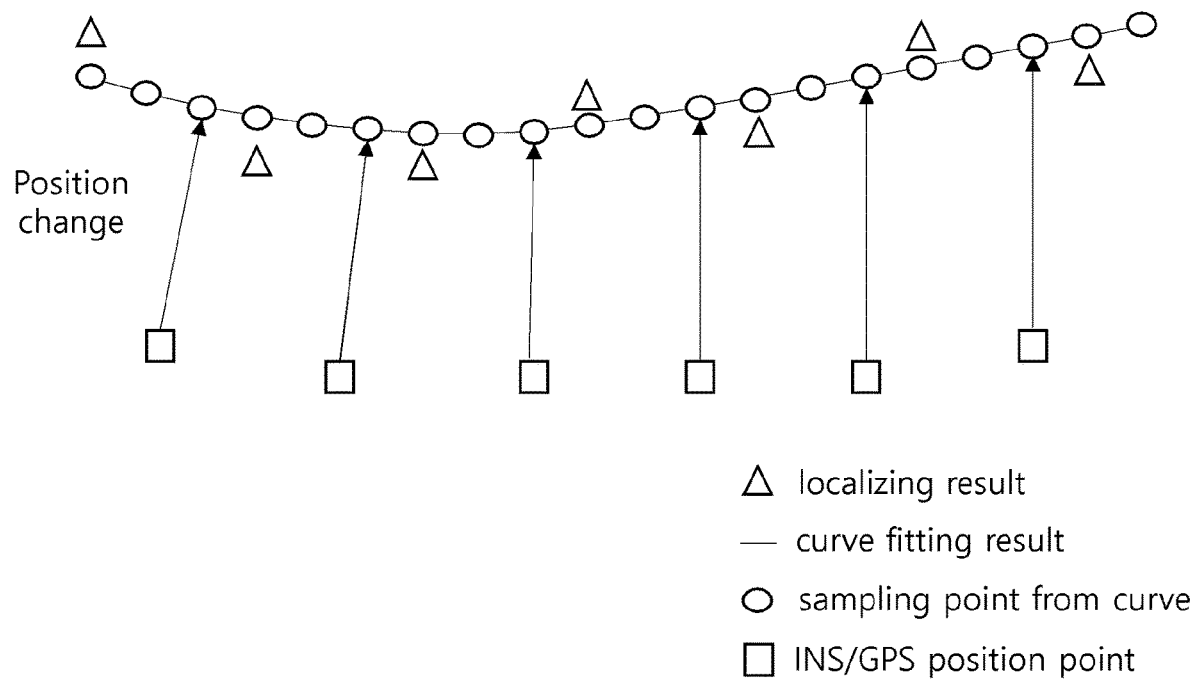
FIG. 7 is an exemplary view for explaining a trajectory correction method according to an embodiment of the present invention.

FIG. 7 is an exemplary view for explaining a trajectory correction method according to an embodiment of the present invention.

Referring to FIG. 7, the map generation device 200 may obtain a curve fitting result, which is a result of curve fitting, by applying curve fitting to an estimated expected result (localizing result).

That is, the map generation device 200 may obtain interpolation and smoothing effects for the 3D point cloud data by applying curve fitting to the expected trajectory (localizing result) of a form of the collected 3D point cloud.

In addition, the map generation device 200 may perform up-sampling on the expected trajectory (localizing result) to which curve fitting is applied. In addition, the map generation device 200 may assign a time stamp to the up-sampled point (sampling point from curve). Here, the map generation device 200 may equally assign time stamps to the up-sampled points (sampling point from curve) at intervals set in advance.

In addition, the map generation device 200 may correct location coordinates (position change) from a point included in the expected trajectory before curve fitting (INS/GPS position point) to a point included in the expected trajectory to which the curve fitting is applied (sampling point from curve), on the basis of the generated time stamp.

Figure 8:
FIG. 8 is an exemplary view for explaining an effect of a trajectory correction method according to an embodiment of the present invention.

FIG. 8 is an exemplary view for explaining an effect of a trajectory correction method according to an embodiment of the present invention.

According to the embodiments of the present invention, errors that may be generated in the process of generating a 3D map can be minimized by correcting errors in 3D point cloud data collected through a LiDAR, and generating a 3D map through a trajectory mapped by applying curve fitting to an expected trajectory estimated through error-corrected 3D point cloud data.

FIG. 8 is a side view visualizing a result obtained when a 3D point cloud map is generated in the trajectory correction method according to an embodiment of the present invention and a result obtained when the trajectory correction method is not applied.

That is, as shown in FIG. 8, as the trajectory correction method is performed, the map generation device 200 may obtain data reflecting a localization result (b), and obtain a result very similar to the reference data (a) compared to the data before correction (c).

As described above, although preferred embodiments of the present invention have been disclosed in the specification and drawings, it is apparent to those skilled in the art that other modified examples based on the technical spirit of the present invention can be implemented in addition to the embodiments disclosed herein. In addition, although specific terms are used in the specification and drawings, they are only used in a general sense to easily explain the technical contents of the present invention and help understanding of the present invention, and are not intended to limit the scope of the present invention. Accordingly, the detailed description described above should not be interpreted as limiting in all respects and should be interpreted illustrative. The scope of the present invention should be selected by reasonable interpretation of the appended claims, and all changes within the equivalent scope of the present invention are included in the scope of the present invention.

| DESCRIPTION OF SYMBOLS | |
| --- | --- |
| 205: Communication unit | 210: I/O unit |
| 215: Storage unit | 220: Error correction unit |
| 225: Trajectory estimation unit | |
| 230: Trajectory correction unit | |
| 235: Trajectory mapping unit | 240: 3D map generation unit |

What is claimed is:

1. A trajectory correction method comprising the steps of:
   correcting, by a map generation device, an error generated due to a change in position targeting 3D point cloud data collected in real time through a LiDAR, of which a position changes in real time, wherein the step of correcting the error includes:
      correcting an error of the 3D point cloud data generated due to a change in the position based on inertial navigation system (INS) data and global positioning system (GPS) data collected together with the 3D point cloud data simultaneously;
      generating fusion data complementing a relative position included in the INS data with an absolute position of the GPS data; and
      searching for fusion data closest to a position of the LiDAR, and correcting the error of the 3D point cloud data generated due to the change in the position based on information on a time of collecting the 3D point cloud data and the fusion data;
   estimating, by the map generation device, an expected trajectory (odometry) related to the change in the position based on the corrected 3D point cloud data, wherein the step of estimating the expected trajectory includes expressing the 3D point cloud data and the fusion data in a voxel space, and estimating the expected trajectory by approximating a point group included in each voxel using a Gaussian distribution;

applying, by the map generation device, curve fitting to the estimated expected trajectory; and mapping, by the map generation device, the expected trajectory before the curve fitting targeting the expected trajectory to which the curve fitting is applied.

2. The method according to claim 1, wherein the step of estimating the expected trajectory includes transforming coordinates of the estimated expected trajectory into coordinates of the fusion data.

3. The method according to claim 2, wherein the step of estimating the expected trajectory includes transforming the coordinates of the estimated expected trajectory into the coordinates of the fusion data through a rotation matrix and a translation matrix for a posture of the LiDAR.

4. The method according to claim 3, wherein the step of applying the curve fitting includes applying the curve fitting to the estimated expected trajectory through a Bezier curve fitting algorithm.

5. The method according to claim 4, wherein the step of applying the curve fitting includes performing up-sampling on the expected trajectory to which the curve fitting is applied, and assigning a time stamp to an up-sampled point.

6. A non-transitory computer readable medium to execute, in combination with a computing device comprising a memory, a transceiver, and a processor for processing instructions resident in the memory, the steps of:

correcting, by the processor, an error generated due to a change in position targeting 3D point cloud data collected in real time through a LiDAR, of which an installation position changes in real time, wherein the step of correcting the error includes:

correcting an error of the 3D point cloud data generated due to a change in the position based on inertial navigation system (INS) data and global positioning system (GPS) data collected together with the 3D point cloud data simultaneously;

generating fusion data complementing a relative position included in the INS data with an absolute position of the GPS data; and searching for fusion data closest to a position of the LiDAR, and correcting the error of the 3D point cloud data generated due to the change in the position based on information on a time of collecting the 3D point cloud data and the fusion data;

estimating, by the processor, an expected trajectory (odometry) related to the change in the position based on the corrected 3D point cloud data, wherein the step of estimating the expected trajectory includes expressing the 3D point cloud data and the fusion data in a voxel space, and estimating the expected trajectory by approximating a point group included in each voxel using a Gaussian distribution;

applying, by the processor, curve fitting to the estimated expected trajectory; and mapping, by the processor, the expected trajectory before the curve fitting targeting the expected trajectory to which the curve fitting is applied.

* * * * *